United States Patent [19]

Franks, Jr.

[11] Patent Number: 5,018,984

[45] Date of Patent: May 28, 1991

[54] TELEPHONE INTERFACE MOUNTING CLAMP

[76] Inventor: George J. Franks, Jr., 664 Thompson Cir., Inverness, Ill. 60067

[21] Appl. No.: 432,636

[22] Filed: Nov. 7, 1989

Related U.S. Application Data

[63] Continuation-in-part of Ser. No. 204,397, Jun. 9, 1988, Pat. No. 4,993,960, which is a continuation-in-part of Ser. No. 116,899, Nov. 5, 1987, Pat. No. 4,828,504.

[51] Int. Cl.⁵ .............................................. H01R 4/66
[52] U.S. Cl. ...................................... 439/92; 29/842; 439/803; 439/814
[58] Field of Search ....................... 248/231.7; 179/38; 439/92, 95, 97, 100, 530, 535, 574

[56] References Cited

U.S. PATENT DOCUMENTS

| | | | |
|---|---|---|---|
| 3,164,668 | 1/1965 | Skubal | 174/38 |
| 3,868,080 | 2/1975 | Olson | 174/38 X |
| 4,273,957 | 6/1981 | Kolling | 439/535 |

Primary Examiner—Eugene F. Desmond
Attorney, Agent, or Firm—Jenner & Block

[57] ABSTRACT

A clamp is provided for mounting a telephone interface box to an electric utility box. The telephone interface box is mounted to a plate which is in turn connected to a clamp secured to the utility box. A moveable slide plate can be used to secure the clamp by moving the slide plate to abut the lid of the utility box. A conduit for protecting a portion of an underground telephone feed is also provided.

28 Claims, 3 Drawing Sheets

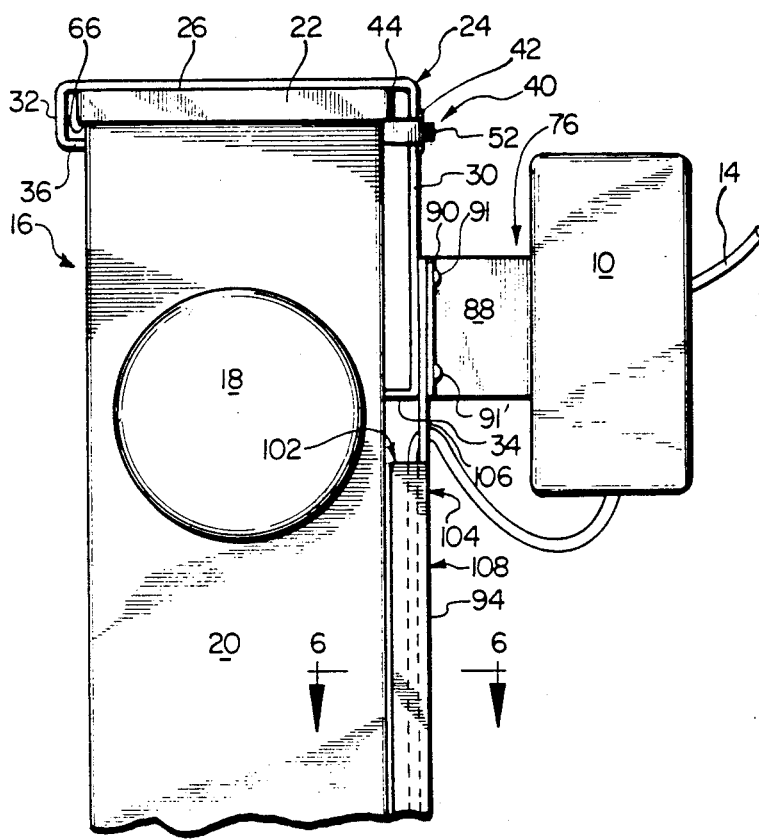
FIG. 1
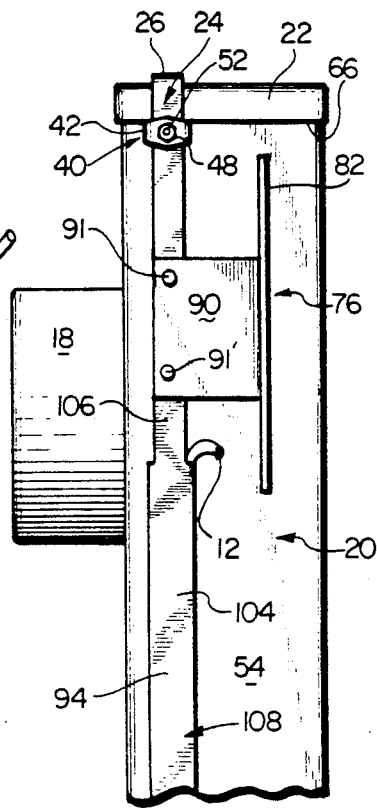
FIG. 7
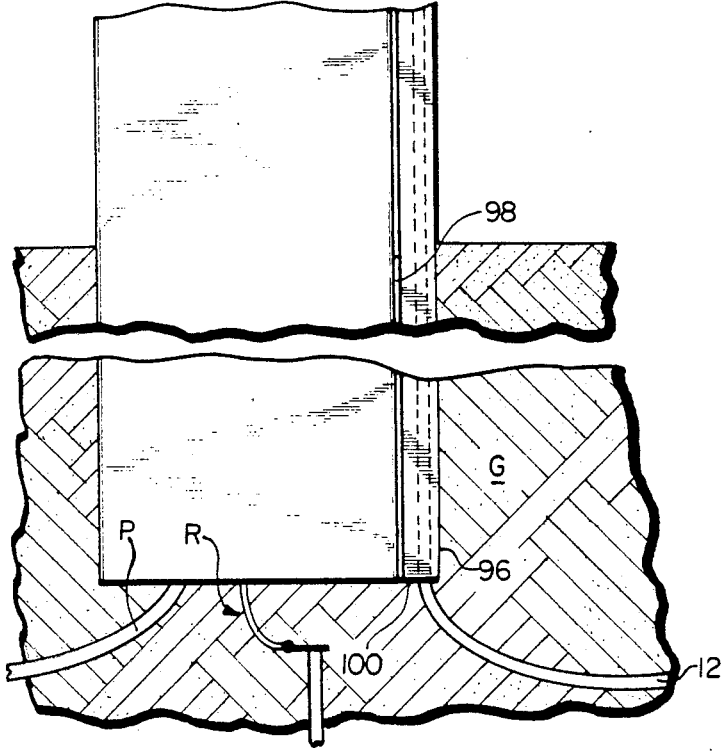
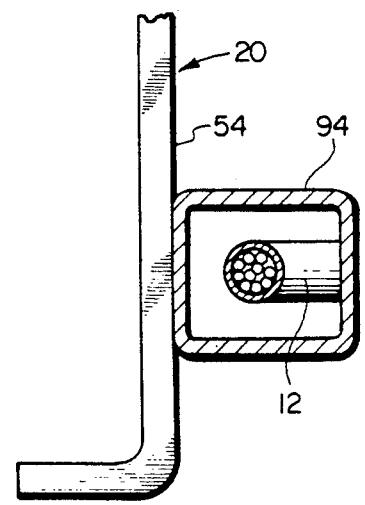
FIG. 6

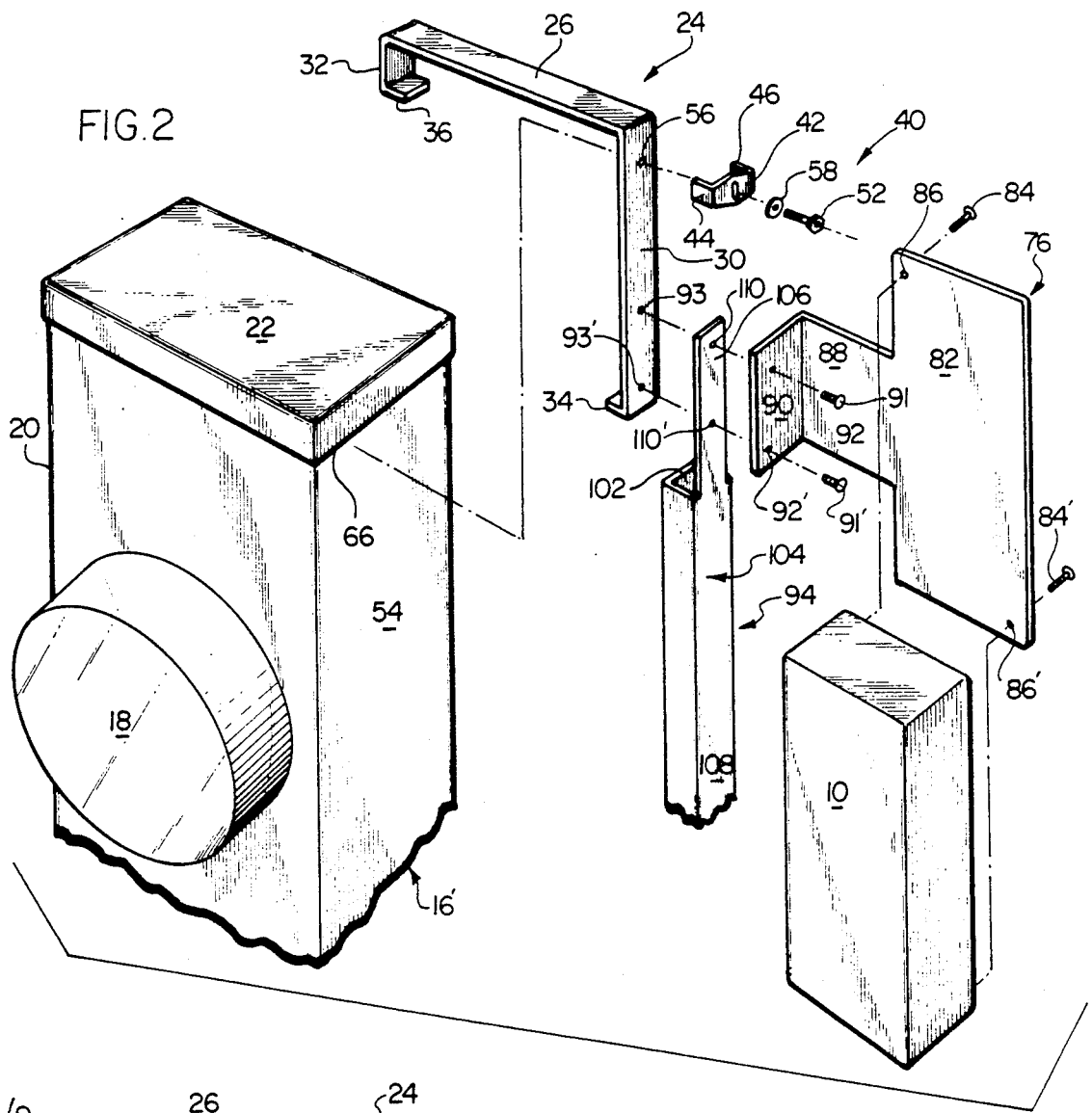
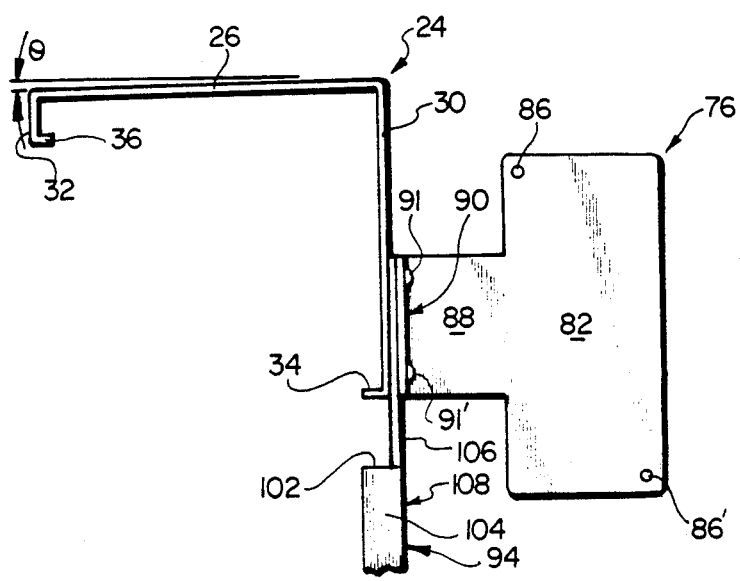

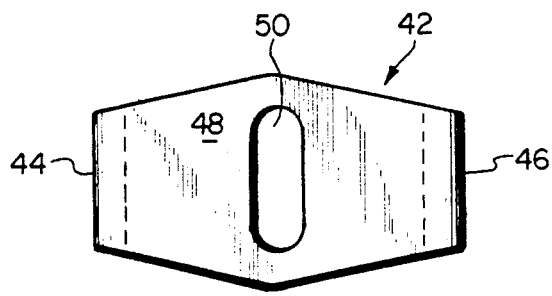
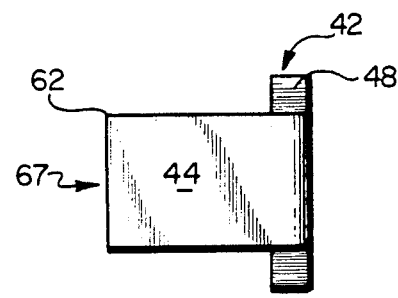
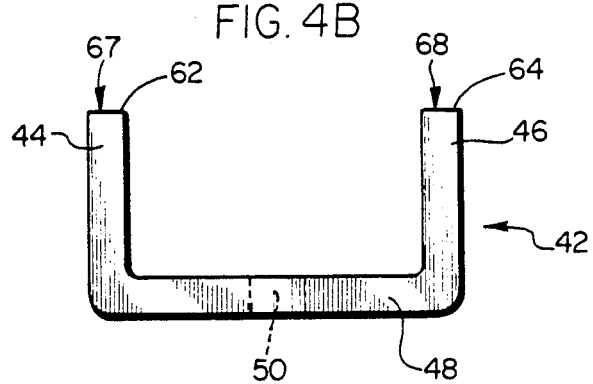
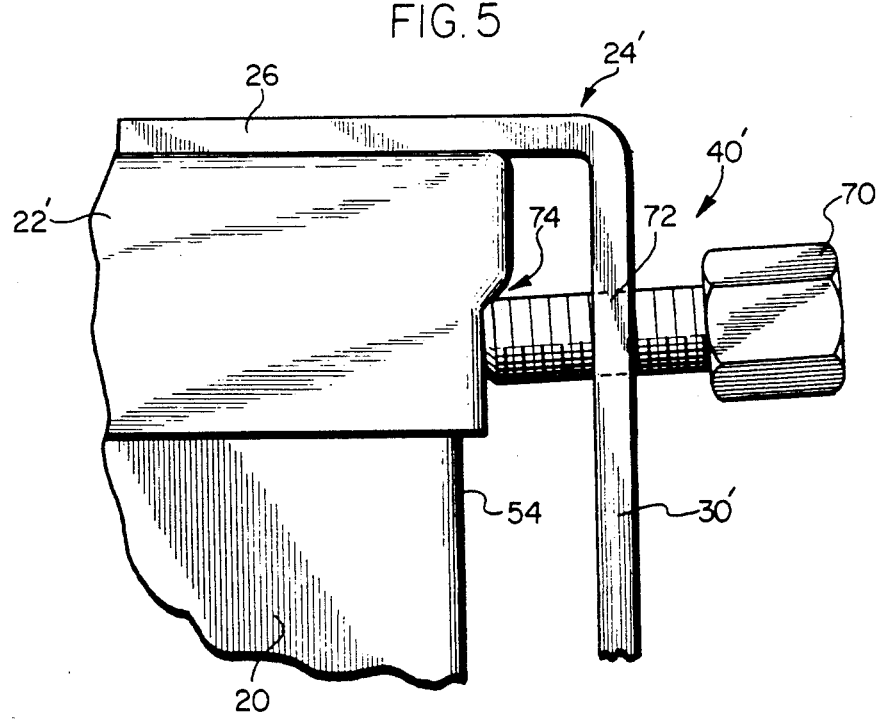

TELEPHONE INTERFACE MOUNTING CLAMP

This is a continuation-in-part now Pat. No. 4,993,960 of application Ser. No. 204,397, filed June 9 1988, which is itself a continuation-in-part of Ser. No. 116,899, filed Nov. 5, 1987, now U.S. Pat. 4,828,504, issued May 9, 1989; the disclosures of which are hereby incorporated by reference.

FIELD OF THE INVENTION

The present invention relates to a clamp for mounting an interface box of a telephone system. In a particular embodiment, a clamp for mounting a telephone interface box to an electric utility box is provided. The telephone interface box is mounted to a clamp secured to the electric utility box, eliminating the necessity of installing the telephone interface box to a wall of the building being serviced by the telephone system.

BACKGROUND OF THE INVENTION

In providing telephone service to a building, a telephone line from the telephone company is typically connected through an overhead riser or buried underground to a telephone system interface box. Conventional telephone wiring then runs from the telephone interface box and into the building to provide the telephone service. Since the telephone system needs to be grounded, a wire of relatively low gauge is connected at one end to the telephone interface box and at its other end to an elongated ground rod sunk into the ground.

The telephone interface box is itself typically mounted to a wall of the building being serviced. The telephone interface box may be mounted to the wall in any one of a variety of known ways. The telephone interface box, for example, can be bolted directly to the wall, or attached to a bracket which is mounted to the wall. The mounting typically requires drilling holes into the wall for the bolts, screws or brackets used.

While the foregoing procedure provides adequate mounting of the telephone interface box, the cost and complexity is high in that holes must be drilled into the building wall, with bolts, screws or brackets used to secure the telephone interface box to the wall. All these various elements require installation, in addition to the cost and complexity of the hardware itself. A simple mounting system for the telephone interface box is needed.

Various arrangements have been known in the art to provide a mount for the telephone interface box. However, it has not been apparent that any of the known arrangements could overcome the problems inherent in the current system of mounting the telephone interface box directly on a wall of the building being serviced.

SUMMARY OF THE INVENTION

In accordance with the present invention, a novel clamp arrangement is disclosed which provides a mount for the telephone system interface box. The clamp is securable to the electric utility box of the electrical power system through securing structure. The telephone interface box is then connected to a plate forming part of the clamp, eliminating the need to separately mount the telephone interface box directly to a wall of the building being serviced.

More specifically, the clamp comprises an elongated, substantially L-shaped clamp which engages opposite sides of the electric utility box. The securing structure for the clamp includes an adjustable slide which snugs up against a portion of the top lid of the utility box.

The simplicity of the clamp and its ease of attachment provide for an effective mount for the telephone interface box that can be performed by persons having no special training. Thus, even consumers of the telephone system, when installing a telephone interface box, can accomplish an adequate mount without the need for special tools. Labor normally associated with establishing an adequate telephone interface box mount on a wall of the building being serviced is generally eliminated.

The novel clamp and plate arrangement which is utilized for this purpose has utility for any metal box enclosure having a lid to which a mount is to be provided. The mounting is accomplished by a securing mechanism which does not penetrate through the metal box and thus does not compromise its integrity and ability to withstand moisture and contaminants.

One object of this invention is to provide a clamp for mounting a telephone interface box without the need for separate installation to a wall of the building being serviced.

It is a further object of this invention to provide an improved clamp which is connectable to a metal box enclosure to provide a mount.

It is a further object of this invention to provide a clamp which is connectable to a utility box to which a telephone interface box is mounted.

Other objects and advantages of the invention will become apparent upon the following detailed description with reference to the drawings, like reference numerals referring to like parts.

BRIEF DESCRIPTION OF THE DRAWINGS

FIG. 1 is a partial front plan view of one embodiment of the invention;

FIG. 2 is a perspective, exploded view of the invention shown in FIG. 1:

FIG. 3 is a partial front view of the invention shown in FIG. 1 illustrating the clamp and conduit;

FIG. 4 is a front plan view of the sliding plate;

FIG. 4A is a side view of the sliding plate of FIG. 4;

FIG. 4B is a top view of the sliding plate of FIG. 4;

FIG. 5 is an elevated partial view of another embodiment of the securing device;

FIG. 6 is a sectional view of the conduit illustrated in FIG. 1 taken along lines 6—6; and FIG. 7 is an elevated partial side view of the invention shown in FIG. 1, without the telephone interface box.

DESCRIPTION OF THE PREFERRED EMBODIMENT

Telephone service is typically connected through overhead risers or buried underground cables to interface equipment located on the outside of a building. FIG. 1 illustrates some of the telephone system interface equipment. The telephone interface box 10 is connected through the underground telephone line feed 12, or alternatively, from a hollow conduit or riser extending outwardly in the case of overhead service (not illustrated), to the external telephone company system. The telephone lines are connected through telephone interface box 10 to the building phone system through conventional wiring 14. The telephone interface box 10 must also be grounded suitably to the ground G in the event that lightning or accidental electrical contact should be made to the telephone wires themselves (not illustrated).

Electrical power is also typically connected through overhead risers or buried underground cable to interface equipment located on the outside of a building. For example, electric utility box 16 of rectangular shape mounts a power meter 18 for determining the amount of power consumption being utilized within the building. The utility box 16 may be an elongated structure 20 extending downwardly and partially buried into the ground G through which the power cables P would be led from an underground feeder system, or alternatively, from a hollow conduit or riser extending outwardly in the case of overhead service (not illustrated). Utility box 16 has thereon a metal cap or lid 22 enclosing the top of utility box 16. Utility box 16 is electrically grounded to ground G by a ground rod assembly, generally indicated at R.

Telephone interface box 10 is typically attached to a wall of the building being serviced (not illustrated). This necessitates drilling holes into the wall of the building, with telephone interface box 10 being secured directly to the wall of the building. The attachment of the telephone interface box 10 to a side of the building is conventional and may take a wide variety of known configurations. For example, telephone interface box 10 may be directly attached to the wall by bolts or screws; alternatively, the telephone interface box 10 can be mounted on a bracket, the bracket itself attached to the wall. Depending on the material of the wall to which telephone interface box 10 or any other mounting apparatus may be attached, installation could be very difficult. The installer must be equipped and ready to install the telephone interface box 10 to, for example, a concrete wall, or a brick wall, or a wood wall.

In accordance with the present invention, the complexity of this prior system and the labor necessary to install the telephone interface box 10 are eliminated by a system which can be installed by persons without specialized training and without comprising the integrity of the electrical power system, the telephone system, or the building wall.

Clamp 24 provides a mechanical connection to utility box 16 for mounting the telephone interface box 10 to utility box 16. A separate telephone interface mounting system is avoided since the telephone interface box 10 is mechanically connected to the utility box 16 rather than to a wall. While the clamp 24 is illustrated in connection with an electrical utility box, it will be apparent that the novel clamp 24 can be used anytime an object is to be mounted to a box enclosure. The mounting can be for purposes of convenience or for any other purpose for which a mechanical connection is to be made to a metal box enclosure.

Referring to FIGS. 1-3 and 7, clamp 24 can be considered an elongated L-shaped clamp with an elongated base 26. The elongated base 26 is longer than one of the sides of the box so as to extend beyond opposing box sides of utility box 16.

First arm or side portion 30 and a second arm or side portion 32 extend outwardly from the common base 26 to engage and bracket the utility box 10 therebetween, as will be apparent. As illustrated in FIG. 3, first arm 30 is longer than second arm 32 and the two arms are substantially parallel to each other. In the preferred embodiment, illustrated in FIG. 3, however, first arm 30 forms an angle less than 90 degrees with base 26, as shown by the acuteness by angle 0 in FIG. 3. Second arm 32 is thus preferably slightly inclined at its lower edge towards first arm 30. The slight inclination allows first and second arms 30 and 32 to be slightly biased against utility box 10 when clamp 24 is placed thereon.

First and second arms 30 and 32 have first and second extensions 34 and 36, respectively, located at their lower ends. First and second extensions 34 and 36 engage the adjacent sides of utility box 16. First and second extensions 34 and 36 point in opposite, but substantially parallel directions and are substantially perpendicular to first and second arms 30 and 32, respectively.

Clamp 24 includes a securing device 40, to form a mechanical connection to the utility box 16, in the form of a sliding plate 42, as illustrated in FIGS. 2 and 4–4B, and the operation of which is shown in FIGS. 1 and 7. Sliding plate 42 can be considered C-shaped or U-shaped and includes a first leg 44 and a second leg 46 extending outwardly from a common base 48. First leg 44 and second leg 46 are preferably substantially parallel to each other. Base 48 can also be of any suitable shape, and also has an elongated slot 50.

A complementary bolt 52 is inserted and moveable within threaded hole 56 in first arm 30 for securing sliding plate 42 to first arm 30. Bolt 52 preferably extends substantially perpendicular to first arm 30 and therefore extends substantially perpendicular relative to the side 54 of utility box 16. Bolt 52 is also received through slot 50 before being received within hole 56. First and second legs 44 and 46 have a length sufficient to reach side 54 when sliding plate 42 is secured against first arm 30. A washer 58 can also be placed on bolt 52 between base 48 and the head of bolt 52.

The securing of clamp 24 to utility box 16 will now be discussed. When clamp 24 is placed on utility box 16, first and second extensions 34 and 36 engage adjacent sides of utility box 16. Bolt 52 is placed through slot 50 and into hole 56. Sliding plate 42 is then moved upward or downward, as appropriate, through the length of elongated slot 50 until the upper edges 62 and 64 of first and second legs 44 and 46, respectively, contact the bottom edge or lip 66 of lid 22. Bolt 52 is then tightened to secure sliding plate 42 in this position. The resulting position of sliding plate 42 is that the front surfaces 67 and 68 of first and second legs 44 and 46, respectively, abut side 54 of utility box 16 and the upper edges 62 and 64 of first and second legs 44 and 46, respectively, abut the lower edge 66 of lid 22.

Alternatively, a securing device 40' comprises a threaded bolt 70, as illustrated in FIG. 5. A threaded opening 72 is formed through first arm 30, to receive bolt 70 therein. Bolt 70 is preferably fine threaded to permit a greater amount of rotational or turning motion against utility box 16. Bolt 70 is then tightened to engage side 54 of utility box 16, securing clamp 24 thereto. As illustrated in FIG. 5, bolt 70 is especially useful when lid 22' has a portion 74 which slopes inwardly towards utility box 16. Opening 72 is positioned to place the end of bolt 70 adjacent sloped portion 74. As bolt 70 is tightened against lid 22', the sloped portion 74 causes bolt 70 to tilt slightly relative to first arm 30. The tilting of bolt 70 has the effect of further securing clamp 24' to utility box 16 by "jamming" bolt 70 into a tilted position.

Telephone interface box 10 or any other suitable component of the telephone system is capable of being mounted directly to plate 76 on clamp 24. Plate 76 has a mounting portion 82 to which telephone interface box 10 is secured with bolts 84 and 84' through holes 86 and 86', respectively, or alternatively, in any conventional way. Extension portion 88 is integral and in substantially the same plane with mounting portion 82, with extension portion 88 in turn being joined to an attachment portion 90. Attachment portion 90 is substantially perpendicular to extension portion 88. Attachment portion 90 is also secured to first arm 30 with bolts 91 and 91, through holes 92 and 92', respectively, in attachment portion 90, and through holes 93 and 93', respectively, in first arm 30, or alternatively, in any conventional way. Plate 76 is made of any suitable material, such as hard plastic or metal.

The mounting of of the telephone interface box 10 to utility box 16 eliminates the complexity of prior systems and the labor necessary to install it by eliminating the need to mount the interface box 10 to an entirely different surface, such as the wall of the building. Further, a ground connection is possible between the telephone interface box 10 and the utility box 16 through a mechanical and electrical connection through plate 76 and clamp 24.

The underground telephone feed 12 is protected from the environment along at least a part of its length above the ground with conduit 94. Conduit 94, as illustrated in FIG. 4, is of substantially rectangular cross-sectional area, although conduit 94 can have any suitable cross-sectional area. Conduit 94 is constructed of any suitable material, such as hard plastic or metal, preferably polyvinyl chloride. As illustrated in FIG. 1, lower end 96 of the conduit 94 is sunk into the ground along at least a part of the length of the side 54 of utility box 16. Double-sided tape 98, or alternatively, any suitable structure, material, or method, is used to hold lower end 96 in position against side 54. Underground feed 12 is fed through the lower opening 100 of conduit 94, through at least a portion of its length and out of the conduit 94 through the upper opening 102.

Conduit 94 has an upper end 104. Upper end 104 has an extension 106, which is essentially a side wall 108 of conduit 94 that has a longer length than the other side walls of conduit 94. Extension 106 is held between first arm 30 and attachment portion 90 by bolts 91 and 91, which pass through holes 110 and 110, in extension 106, respectively. The combination of tape 98 and extension 106 effectively hold conduit 94 in place against utility box 16.

By this arrangement, and if conduit 94 and plate 76 are made of an electrically conductive material, a ground connection is possible for the telephone interface box 10 since the lower end 96 of conduit 94 is sunk into the ground, and when upper end 104 of conduit 94 is mechanically and electrically connected to interface box 10 through plate 76.

While the invention is described in connection with preferred embodiments, it will be understood that it is not intended to limit the invention to these embodiments. On the contrary, it is intended to cover all alternatives, modifications and equivalents as may be included in the spirit and scope of the invention as described by the appended claims.

What is claimed is:

1. A clamping for mounting a telephone interface box to a utility box comprising:
   an elongated base which spans one side of the utility box, said base having a pair of arms extending from the base for positioning the arms adjacent opposite sides of the utility box, with each of the arms being engageable with its adjacent side of the utility box;
   means for securing the clamp to the utility box; and
   a mounting plate attached to one of the arms, with the telephone interface utility box being secured to the mounting plate.

2. The clamp of claim 1 wherein one of the arms forms an acute angle with the base.

3. A clamp for mounting a telephone interface box to a utility box comprising:
   an elongated base which spans one side of the utility box and having a pair of arms extending from the base for positioning the arms adjacent opposite sides of the utility box, with each of the arms being engageable with its adjacent side of the utility box;
   a slide plate mounted for limited relative movement of one of the arms, and capable of abutting a portion of the utility box to secure the clamp thereto; and
   means for securing the telephone interface box to the clamp.

4. The clamp of claim 3 wherein the clamp securing means comprises a bolt receivable through a slot in the slide plate and into a threaded hole in the arm, the bolt capable of being tightened to secure the slide plate to the arm.

5. The clamp of claim 3 wherein one of the arms forms an acute angle with the base.

6. The clamp of claim 3 wherein a lower end of each of the arms has an extension portion directed towards a side of the box for engagement with adjacent sides of the utility box.

7. The clamp of claim 3 further comprising an elongated conduit secured to the clamp for containing a portion of the length of a telephone line.

8. The clamp of claim 7 wherein the conduit is secured at one end to the clamp and its other end is at least partially buried underground.

9. The clamp of claim 7 wherein the conduit has a rectangular cross-section.

10. The clamp of claim 3 wherein said utility box includes an edge projecting away from an adjacent side of the utility box and wherein said slide plate abuts both the edge and the adjacent side of the box.

11. The clamp of claim 3 wherein said box includes a lid having a bottom edge generally perpendicular to the adjacent side of the box, and wherein said slide plate abuts both the adjacent box side and the led bottom edge.

12. The clamp of claim 3 wherein said slide plate comprises a U-shaped plate having an elongated slot and a screw insertable through the slot for attaching the plate to one of the arms, the screw permitting plate movement along the slot when the screw is loosened and fixing the plate position when the screw is tightened.

13. A clamp for mounting a telephone interface box to a utility box comprising:
   an elongated base which spans one side of the utility box and having a pair of arms extending from the base for positioning the arms adjacent opposite sides of the utility box, with each of the arms being engageable with its adjacent side of the utility box;
   securing means for securing the clamp to the box comprising a threaded opening in one of the arms and a threaded bolt moveable therethrough and into engagement with its adjacent side of the utility box; and
   means for securing the telephone interface box to the clamp.

14. The clamp of claim 13 including a utility box having a first surface generally inclined toward a utility box side and a second surface generally parallel to an adjacent utility box side wherein said threaded bolt engages the first and second surfaces.

15. The clamp of claim 14 wherein said utility box includes an upper lid, said lid including said first and second surfaces.

16. A clamp for mounting a telephone interface box to a utility box comprising:

a first portion and a second portion extending outwardly from an elongated base for positioning the portions on opposite sides of the utility box;

a mounting plate secured to the first portion to which the telephone interface box is secured; and means for securing the clamp to the utility box.

17. The clamp of claim 16 wherein the clamp securing means comprises a threaded opening in one of the arms and a threaded bolt moveable therethrough and into engagement with the adjacent side of the box.

18. The clamp of claim 16 wherein one of the arms forms an acute angle with the base.

19. The clamp of claim 16 wherein each of the portions has an extension formed at their lower ends for engagement with the box.

20. The clamp of claim 16 wherein the clamp securing means comprises a slide plate mounted for limited relative movement on one o the arms, and capable of abutting a portion of the utility box to secure the clamp thereto.

21. The clamp of claim 20 wherein the clamp securing means comprises a bolt receivable through a slot in the slide plate and into a threaded hole in the arm, the bolt capable of being tightened to secure the slide plate to the arm.

22. The clamp of claim 16 further comprising an elongated conduit secured to the clamp for containing a portion of the length of a telephone line.

23. The clamp of claim 22 wherein the conduit is secured at one end to the clamp and its other end is at least partially buried underground.

24. A method of installing a telephone interface box comprising the steps of:

securing a clamp to the outer sides of an electric utility box, the clamp comprising a first arm and a second arm extending outwardly from an elongated base for positioning the arms on opposite sides of the electric utility box, and a mounting plate secured to the first arm to which the telephone interface box is secured; and securing the telephone interface box to the mounting plate.

25. A kit for mounting a telephone interface utility box to an electrical utility box comprising:

a clamp comprising a first arm portion and a second arm portion extending outwardly from an elongated base for positioning the portions on opposite sides of the utility box;

a mounting plate attachable to the first arm portion to which the telephone interface box is secured;

means for attaching the plate to the first arm portion; and means for securing the clamp to the utility box.

26. The kit of claim 25 wherein the clamp securing means comprises a threaded opening in one of the arms and a threaded bolt moveable therethrough and into engagement with the adjacent side of the utility box.

27. The kit of claim 25 wherein the clamp securing means comprises a slide plate mounted for limited movement on the first arm, and capable of abutting a portion of the utility box to secure the clamp thereto.

28. The kit of claim 27 wherein the clamp securing means comprises a bolt receivable through a slot in the slide plate and into a threaded hole in the arm, the bolt capable of being tightened to secure the slide plate to the arm.

* * * * *